Jan. 24, 1933.  F. W. BURGESS  1,895,147
TRACTOR WHEEL LUG CLEANER
Filed Nov. 25, 1930  2 Sheets-Sheet 2
Fig. 3.
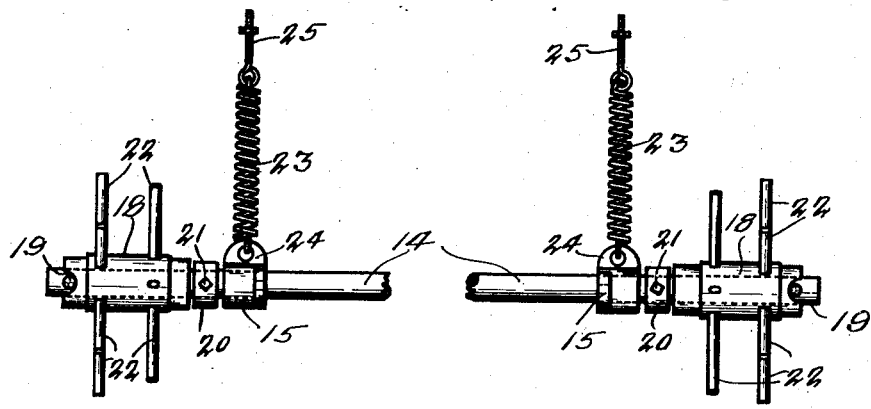
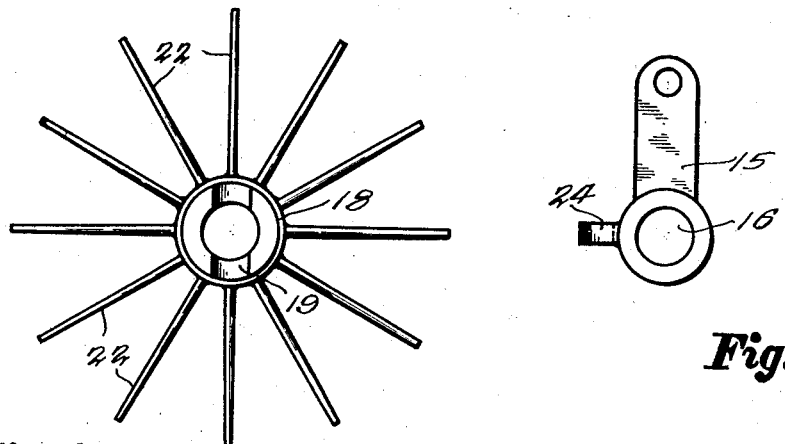
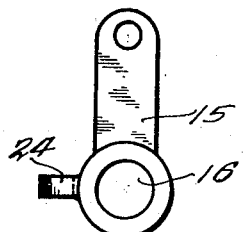
Fig. 5.
Fig. 4.
Inventor
F. W. Burgess
By Arthur H. Sturges
Attorney Patented Jan. 24, 1933

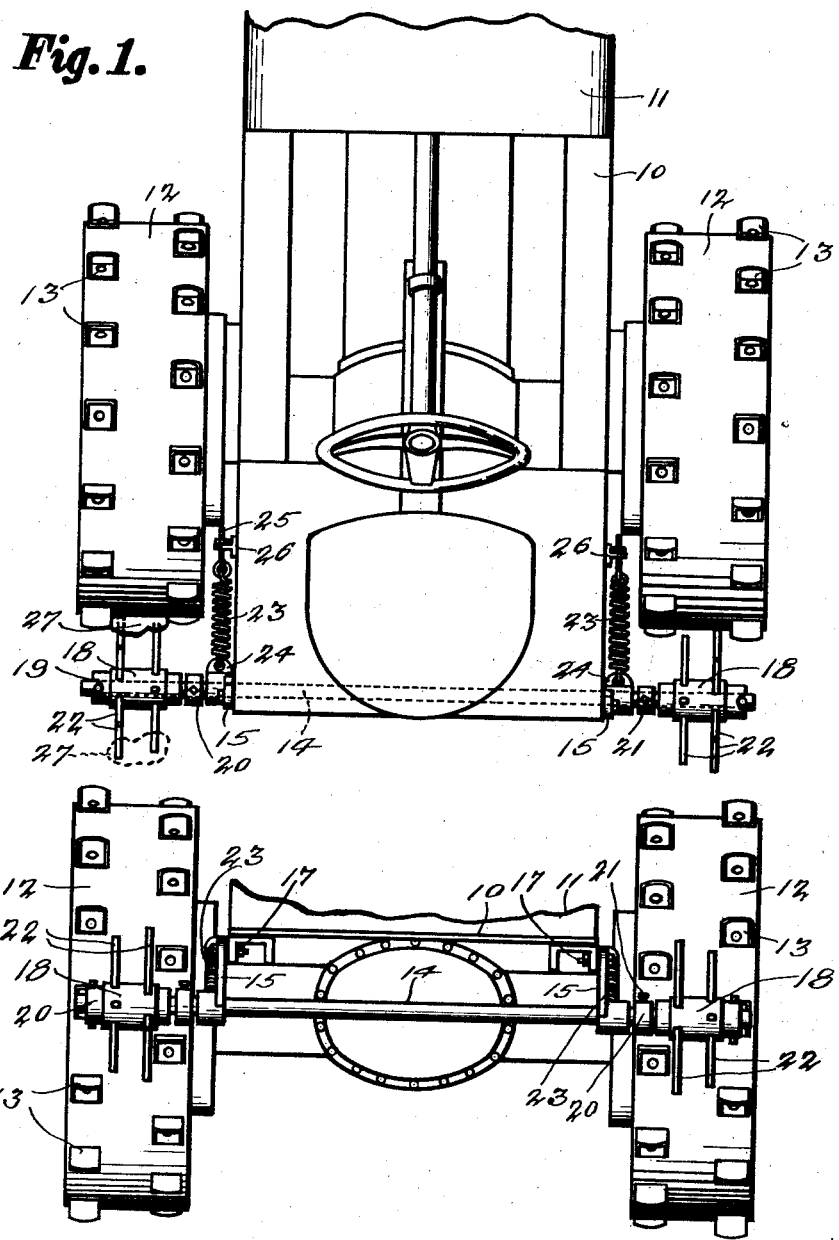

1,895,147

UNITED STATES PATENT OFFICE

FRANK W. BURGESS, OF COOK, NEBRASKA

TRACTOR WHEEL LUG CLEANER

Application filed November 25, 1930. Serial No. 498,160.

This invention relates to traction devices and has particular relation and connection with means for removing clods, lumps and soft earth from the traction wheels of a tractor when the latter travels over soft or lumpy soil.

An object of the invention is to conserve the fuel necessary for driving a tractor and thus provide means whereby the latter may be economically operated.

A further object of the invention is to provide a device for the above stated purposes which may be easily adjusted for accommodating soil of various conditions or degree of hardness and the like.

Other and further objects and advantages of the invention will be understood from the following detailed description, reference being had to the accompanying drawings, in which:

Figure 1 is a fragmentary top plan view of the rear end or traction end of a tractor showing the traction wheels with the new device applied thereto.

Figure 2 is an end elevation of the parts shown in Figure 1.

Figure 3 is a top plan view of the appliance removed from the tractor with parts broken away.

Figure 4 is a side view of one of the clod removers, and

Figure 5 is a side view of a hanger arm employed.

Referring now to the drawings for a more particular description in which like numerals of reference designate like or corresponding parts, 10 indicates a frame of a tractor adapted to be carried by the rear axle of the latter, the engine thereof being indicated at 11.

The traction wheels 12 are provided with a plurality of annularly disposed lugs 13, which are adapted to engage with the ground, thereby preventing the wheels from slipping in soft earth, mud or lumpy soil. The said lugs may be of any selected lengths and are conventional.

The new device comprises a transversely disposed shaft 14 which is best shown in Figure 3.

In Figure 5 one of two bracket hanger arms 15 is illustrated, and said arms are secured to the frame of the tractor by means of bolts 17 or the like, the said shaft 14 being received within the apertures 16 of the arms 15, the said apertures providing a journal mounting for said shaft 14.

Upon the outer ends of the shaft 14 are mounted hubs 18 provided with notches 19 to receive cotted pins 28 which extend through the shaft 14 and confine the hubs from outer movement. Inward movement of the hubs 18 is prevented by collars 20 affixed in desired positions on the shaft 14 by set screws 21. Each hub 18 carries a plurality of spikes or fingers 22. Two sets of spikes are advantageously provided to each hub, and the ends of the spikes fit between the lugs 13 and engage against the periphery of the tractor wheels 12.

Resilient members or springs 23 are employed for causing the spikes to engage against the traction wheels. The springs 23 are attached to ears 24 of the hanger arms and to adjusting bolts 25 which engage through brackets 26 on the frame 10.

In operation, the clods of earth indicated at 27 become engaged upon the spikes 22 and, as the latter move upwardly and outwardly by reason of contact with the revolving wheels 12 of the tractor, the earth or clods become impinged upon the spikes 25 and are later thrown off therefrom when the spikes are turned to a downwardly descending position, thus throwing the earth or clods of earth rearwardly and disengaging the latter from the traction wheels.

The springs 23 draw the spikes resiliently against the wheels, the shaft 14 having a swinging movement about the bolts 17 as a center. Thus the whole assembly is swingingly supported and is a unit which may be attached to any tractor. The spikes may yield away from the wheels 12 as the clods pass. Adjustment of the screws 25 will change the spring tension.

I do not wish to be restricted to the size, form, and proportions of the various parts, and obviously changes could be made in the construction herein described without departing from the spirit of the invention, it being only necessary that such changes fall within the scope of the appended claim:—

What is claimed is:—

A mud clearing device for traction wheels comprising a transverse shaft, pivotal supporting means for the shaft whereby said shaft is mounted to the rear frame of a tractor, spiked wheels mounted to rotate upwardly and outwardly on said transverse shaft and disposed in a medial line with the traction wheels, the spikes of said spiked wheels adapted to engage against the periphery of and be frictionally driven by the traction wheels whereby clods of mud adhering to the traction wheels become impinged on said spikes and thrown rearwardly to clear the traction wheels, and means for holding said transverse shaft toward the traction wheels.

In testimony whereof, I have affixed my signature.

FRANK W. BURGESS.